June 12, 1928.
L. N. CRICHTON
1,673,553
CIRCUIT INTERRUPTER RELAY
Filed March 1, 1924
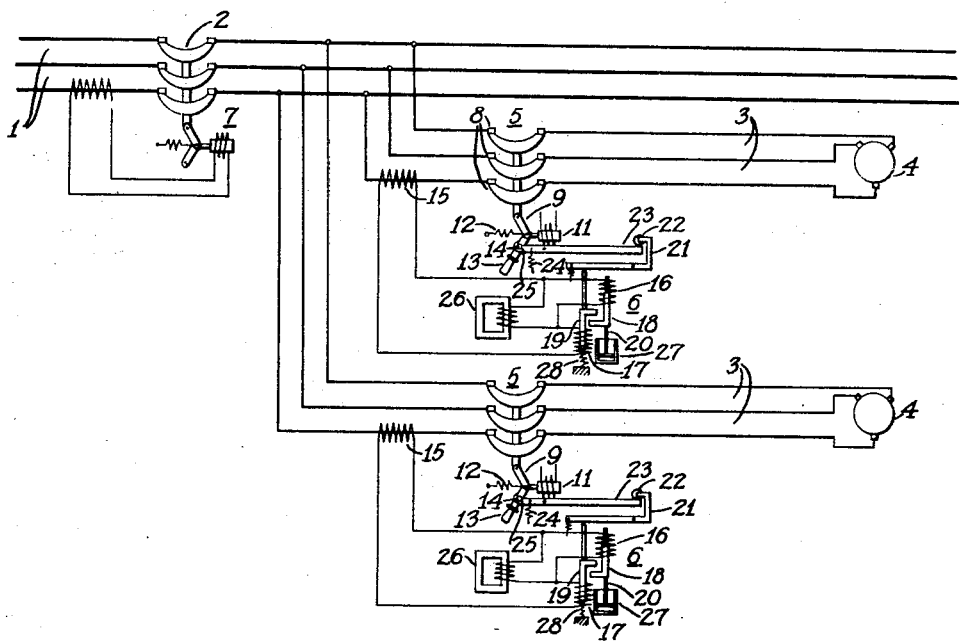
WITNESSES:
INVENTOR
Leslie N. Crichton
BY
ATTORNEY Patented June 12, 1928.

1,673,553

UNITED STATES PATENT OFFICE.

LESLIE N. CRICHTON, OF WILKINSBURG, PENNSYLVANIA, ASSIGNOR TO WESTING-HOUSE ELECTRIC & MANUFACTURING COMPANY, A CORPORATION OF PENNSYLVANIA.

CIRCUIT-INTERRUPTER RELAY.

Application filed March 1, 1924. Serial No. 696,181.

My invention relates to systems of electrical distribution and more particularly to circuit interrupter systems.

An object of my invention is to provide a system of distribution that shall embody a circuit interrupter of relatively large capacity in the distributing circuit and circuit interrupters of smaller capacity in the feeder circuits at the points of distribution.

Another object of my invention is to provide a system of electrical distribution comprising a main circuit having a circuit interrupter therein and a plurality of feeder circuits, each of which is provided with a circuit interrupter that is adapted to operate under predetermined overload conditions, but is held in its closed position under greater overload or short-circuit conditions, whereupon the main circuit interrupter is operated by reason of the overload thereon, the circuit interrupter of the overloaded circuit then being operated mechanically.

Another object of my invention is to provide a suitable releasing mechanism for feeder circuit interrupters of the above-indicated character.

Another object of my invention is to provide a system of electrical distribution embodying a distributing circuit having a main circuit interrupter therein and a plurality of feeder circuits each of which has a circuit interrupter therein, the circuit interrupters being so controlled that they are operated in a predetermined sequence without any interconnected relays or devices other than the ordinary conductors.

A further object of my invention is to provide a distributing system having a main large capacity circuit interrupter and a plurality of feeder circuits with small capacity circuit interrupters, the latter being of such capacity as to withstand the mechanical and electrical strains that are encountered under short-circuit currents but that are not of sufficient capacity to safely interrupt them, such short-circuit currents being interrupted by the main large capacity circuit interrupter, thereby effecting a substantial saving in the initial cost of such systems.

In the accompanying drawings:

The figure is a diagrammatic illustration of circuits and apparatus embodying my invention.

My invention comprises, in general, a main circuit 1, that is connected to any suitable source of energy and that is provided with a main circuit interrupter 2, of any preferred type, and a plurality of distributing circuits 3 for supplying energy to any suitable electrical translating device 4 from the circuit 1 through circuit interrupters 5, each of which is provided with a suitable tripping mechanism 6, hereinafter described.

The circuit interrupter 2 is provided with a suitable overload tripping device 7 that may be of any suitable type. Each circuit interrupter 5 comprises a plurality of bridging members 8 that are connected by a toggle link mechanism 9 to the movable member of a closing electromagnet 11 that operates against the tension of a spring 12. A handle 13 is provided on one of the links of the mechanism 9 for the manual operation of the circuit interrupter. The toggle link mechanism 9 is provided with a suitable pin 14 for engaging the tripping mechanism hereinafter described. A current transformer 15 is connected to each of the circuits 3.

The tripping mechanism 6 comprises coils 16 and 17 that are provided with armature members 18 and 19, respectively, having projections 20 thereon of L-shape. The coil 16 has a greater number of turns than the coil 17. The core members 18 and 19 are disposed below a bell crank lever 21 that is provided with a roller 22 that bears upon a lever arm 23 for counterbalancing the tension of a spring 24. The lever arm 23 is provided with a seat or depression 25 for engaging the pin 14.

The coil 17 is connected in series with the current transformer 15. A saturated transformer 26 and the coil 16 are connected in parallel relation to each other and in series relation to the current transformer 15 and the coil 17. The core member 18 is provided with a dash-pot 27 for securing a time element in its operation. The core member 19 rests upon a coil spring 28.

Upon the occurrence of overload conditions in any one of the circuits 3, the current transformer 15 becomes increasingly energized and the coil 17 tends to draw the core member 19 downwardly against the spring 28, while the coil 16 tends to raise its core member 18 against the action of the dash-pot 27 dependent upon the state of saturation of the transformer 26. When the overload does not exceed the rupturing capacity of the circuit interrupter 5, the energization of the coil 17 is insufficient to actuate the core member 19, but the coil 16 is sufficiently energized to actuate the core member 18 upwardly into engagement with the bell crank 21, thereby liberating the pin 14 from the seat 25 to permit the circuit interrupter to be moved to its open position by the spring 12. The circuit interrupter 5 may be reset manually or by the energization of the coil 11.

Under conditions of excessive overload, such as short-circuits, the ratio of the current traversing the coil 17 to that traversing the coil 16 is so increased, by reason of the saturation of the transformer 26, as to enable the coil 17 to actuate the core member 19 downwardly against the spring 28 until its extension 20 engages the extension 20 on the core member 18, and together with the dash-pot 27, prevents the latter from moving upwardly. This condition exists so long as the overload continues or until the circuit interrupter 2 of the main circuit 1 is operated by its own overload tripping mechanism 7, whereupon the coil 17 becomes deenergized and the core member 19 is projected upwardly against the bell crank 21 by the stored energy in the spring 28, with the result that the overloaded circuit interrupter 5 is opened.

So soon as the circuit interrupter 2 is again moved to its closed position, the unaffected circuits 3 continue to function while the circuit 3 that was overloaded or short-circuited is disconnected from the circuit 1.

It will thus be seen that I have provided a system of distribution in which the several feeder circuit interrupters operate with predetermined overloads on their several circuits but when a condition of excessive overload or chort-circuit arises, the several feeder circuit interrupters remain in their closed positions until the main circuit interrupter is operated, whereupon the circuit interrupter in the overloaded circuit is tripped by energy stored during the continuance of the overload.

I do not wish to be restricted to the specific circuit connections or arrangement of parts herein set forth, as various modifications thereof may be effected without departing from the spirit and scope of my invention. I desire, therefore, that only such limitations shall be imposed as are indicated in the appended claims.

I claim as my invention:

1. A control device for a feeder circuit interrupter comprising a current transformer associated with the feeder circuit, two series-connected electromagnets energized from the current transformer, means for controlling the operation of the feeder circuit interrupter in accordance with the relative energization of the electromagnets, a reactor having a magnetically saturable core member, and means for so connecting the reactor in circuit with the current transformer and the electromagnets that the relative energization of the electromagnets is varied in accordance with the value of current traversing the feeder circuit.

2. A control device for a feeder circuit interrupter comprising a current transformer associated with the feeder circuit, two series-connected electromagnets energized from the current transformer, means for tripping the feeder circuit interrupter when one of the electromagnets is energized above a predetermined degree and the other is energized below a predetermined degree, and for precluding such tripping when said other electromagnet is energized above a predetermined degree, and a reactor having a magnetically saturable core member and so connected with respect to the electromagnets that the relative energization of the electromagnets is varied in accordance with the value of current traversing the feeder circuit.

In testimony whereof, I have hereunto subscribed my name this 26th day of February, 1924.

LESLIE N. CRICHTON.